United States Patent

Ervay et al.

Patent Number: 5,114,287
Date of Patent: May 19, 1992

[54] PROCESS FOR PRODUCING FACE HOBBED BEVEL GEARS WITH TOE RELIEF

[75] Inventors: Earl D. Ervay, Fairport; Mark J. Boch, East Rochester, both of N.Y.

[73] Assignee: The Gleason Works, Rochester, N.Y.

[21] Appl. No.: 502,385

[22] Filed: Mar. 30, 1990

[51] Int. Cl.⁵ .......................... B23F 9/10; B23F 19/10
[52] U.S. Cl. .......................................... 409/13; 409/26
[58] Field of Search ........................ 409/13, 26, 27, 28, 409/29, 30

[56] References Cited

U.S. PATENT DOCUMENTS

| | | |
|---|---|---|
| 1,932,781 | 10/1933 | Hill . |
| 1,969,843 | 8/1934 | Head ..................... 409/26 |
| 1,985,409 | 12/1934 | Hill . |
| 2,248,168 | 7/1941 | Gleason . |
| 2,270,003 | 1/1942 | Head . |
| 2,329,804 | 9/1943 | Wildhaber . |
| 2,385,220 | 9/1945 | McMullen . |
| 2,772,602 | 12/1956 | Christman . |
| 2,857,819 | 10/1958 | Wildhaber et al. . |
| 2,978,964 | 4/1961 | Wildhaber ..................... 409/26 |

FOREIGN PATENT DOCUMENTS 263721 12/1949 Switzerland .

OTHER PUBLICATIONS

Endrem, The Gleason Works, Mar. 1969.

Primary Examiner—Z. R. Bilinsky
Attorney, Agent, or Firm—Ralph E. Harper; Robert L. McDowell

[57] ABSTRACT

A method of forming a relief at the toe end of the teeth on a bevel gear is disclosed. The width of the blades that cut the longitudinally extending convex or concave profiles of the flanks of the teeth is increased to a dimension greater than the width of the tooth slot at the toe end whereby additional stock is removed from the toe end of the flank opposite the flank being cut by the blades. The relief is formed at the toe end of each tooth with the relief being on the same flank profile for all teeth. Lapping interference is eliminated. A separate chamfering operation is not required.

12 Claims, 4 Drawing Sheets

PROCESS FOR PRODUCING FACE HOBBED BEVEL GEARS WITH TOE RELIEF

TECHNICAL FIELD

The present invention relates to a continuous method of forming bevel gears and in particular to a method of continuous face hobbing whereby a relief is introduced into the tooth flanks at the toe end.

BACKGROUND OF THE INVENTION

In the context of this specification and its claims, reference will be made to "bevel" gears. This reference is intended to include gears that are generally conical in form and operate on intersecting axes or non-parallel, non-intersecting axes, for example, hypoid gears.

The formation of non-generated bevel gears may be accomplished by a plurality of methods among which are face milling or face hobbing.

Face milling comprises rotating cutting blades arranged in a circle about a cutter and in line with each other. The work piece is held against rotation during cutting. After a tooth is formed the work piece is indexed to the position of the next tooth space and the cutting process is repeated.

Face hobbing also comprises cutting blades arranged in a circle about a cutter, not in line with each other, but in groups, usually pairs. Unlike most face milling processes, in which one cutting blade passes through the tooth slot at a time, face hobbing comprises each group of cutting blades passing through a tooth slot with each blade in the group forming a cut completely along the longitudinal portion of the tooth slot. The face hobbing process is such that more than one blade is present in the tooth slots at any given time. The cutter and the workpiece rotate in a timed relationship to each other thereby allowing continual indexing of the workpiece and continual formation of each tooth slot of the gear. See, for example, U.S. Pat. No. 2,978,964 to Wildhaber.

After the face milling or hobbing has been performed a deburring operation is carried out.

The next operation generally performed after cutting and deburring is heat treating in order to harden the gear. The particular heat treat parameters are selected in order to produce the properties required for the environment in which the gear will be used.

After the face milling or face hobbing operation, deburring and heat treating, the gear is subjected to a hard finishing process. Examples of this process include grinding, skiving or lapping.

Grinding and skiving are correction processes to reshape the gear to a predetermined form. These processes may be utilized to correct dimensional irregularities due to warpage as a result of heat treating.

Lapping is also a semi-corrective process comprising rolling two gear members together, i.e. ring gear and pinion, in the presence of an abrasive. The abrasive is generally composed of an abrasive grit suspended in a fluid material. The object of lapping is to improve tooth contact patterns between the gear members and to improve surface finish.

It is during the operation of the gears that the problem of lapping interference arises. Lapping interference is the result of contact between the lapped portion of a bevel gear and an unlapped portion of a mating pinion. The interference occurs at the sharp corner of the toe end, generally on the convex side (drive side), of the bevel gear due to contact with an unlapped area of the mating pinion. Misalignment at assembly or deflection, for example, could cause the bevel gear to shift slightly relative to the pinion and contact an unlapped area. Lapping interference therefore results from the mismatch of lapped and unlapped surfaces. The results of lapping interference include excessive gear noise, pitting at the interference point or breakage of the gear tooth.

In the production of bevel gears by face milling the problem of lapping interference has been addressed by the inclusion of a secondary finishing operation which removes additional stock, i.e. creates a relief, at the toe end on the convex side (drive side) of the gear. The cutting blade is given a momentary axial thrust and then withdrawn slightly as it enters the toe end of the tooth slot thereby removing additional stock and creating a relief. Since there is no sharp corner remaining at the toe end of the convex side there can be no lapping interference.

However, the axial thrust procedure of face milling does not apply to face hobbing. As previously stated, face hobbing involves more than one cutting blade present in the tooth slots at any given time. It can be seen that providing an axial thrust to a cutting blade entering a tooth slot would mean that the cutting blade or blades already in a tooth slot would also be subjected to the same axial thrust. The result would be gouging of the interior of the tooth slots by those cutting blades.

Therefore, until now, the only way to eliminate lapping interference in face hobbed bevel gears was to include a separate chamfering operation after lapping in which stock material at the toe end of generally the convex side of the gear was removed thereby forming a relief.

It has now been discovered that a relief can be formed during the face hobbing process. This discovery eliminates the additional chamfering process resulting in considerable savings of both time and money.

SUMMARY OF THE INVENTION

The present invention is directed to a method of continuously forming a relief at the toe end of the teeth of a face hobbed bevel gear. The gear comprises a plurality of teeth arranged about the gear with each of the teeth extending in a longitudinally curved direction from a toe end to a heel end. Each tooth further comprises a topland and two flank portions with the flank portions extending from the topland downwardly to root portions located between adjacent teeth. One flank portion has a longitudinally extending concave profile and the other flank portion has a longitudinally extending convex profile. The flank of a tooth and the root portion and adjacent flank of an immediately adjacent tooth form a tooth slot with the tooth slot extending in a longitudinally curved and tapered direction from the toe end to the heel end. A plurality of tooth slots and teeth are arranged alternatively about the gear. The convex profiled flank or the concave profiled flank of each tooth has a relief formed thereon at the toe end thereof.

The process comprises providing a cutter having a plurality of cutting blades thereon and arranging the blades about the cutter in groups comprising inside blades and outside blades. The inside blades or the outside blades are provided with a cutting width of a dimension greater than the width of the tooth slots at the toe ends thereof. The cutter and a gear blank are rotated and engaged in a timed relationship. The outside blades cut the concave profiled flanks and the inside blades cut the convex profiled flanks. Simultaneously with cutting, relief surfaces are formed at each of the toe ends of one of the convex flanks and the concave flanks with the relief surface being formed in the same flank profile for all teeth of the gear. In other words, relief surfaces are formed in flanks of the same curvature, i.e. the relief is formed at the toe ends of all convex flanks or the relief is formed at the toe ends of all concave flanks.

Therefore it can be seen that the outside blade which cuts the concave flank would also cut the relief surface on the convex flank and the inside blade which cuts the convex flank would also cut the relief surface on the concave flank.

DETAILED DESCRIPTION OF THE INVENTION

The preferred embodiments of the present invention will now be described with reference to the accompanying Drawing Figures.

Figure 1:
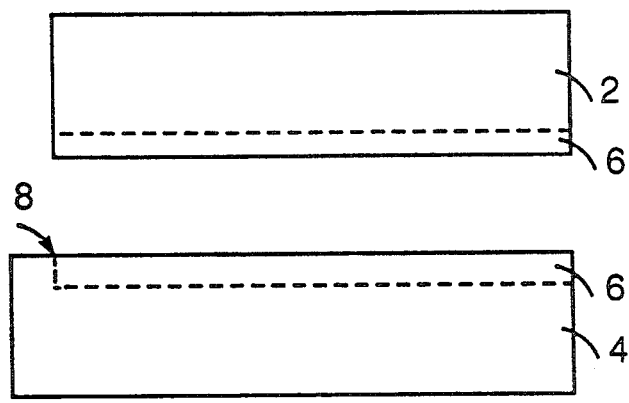
FIG. 1 illustrates the location of lapping interference between a bevel gear tooth and a mating pinion gear tooth.

Lapping interference is a problem encountered when gear surfaces, previously lapped, contact an unlapped surface due to a mismatch of the surfaces, for example by misalignment at assembly or deflection. This is shown in FIG. 1 in which 2 represents a tooth of a bevel gear and 4 represents the tooth of a mating pinion. The lapping region is shown by 6. Lapping interference occurs on the pinion gear tooth 4 at the sharp corner intersection 8 of lapped and unlapped surfaces due to any mismatch which would cause the tooth of the bevel gear 2 to contact the unlapped area of the pinion gear tooth 4. The results of lapping interference include excessive gear noise, pitting at the interference point or breakage of the gear tooth.

Figure 2:
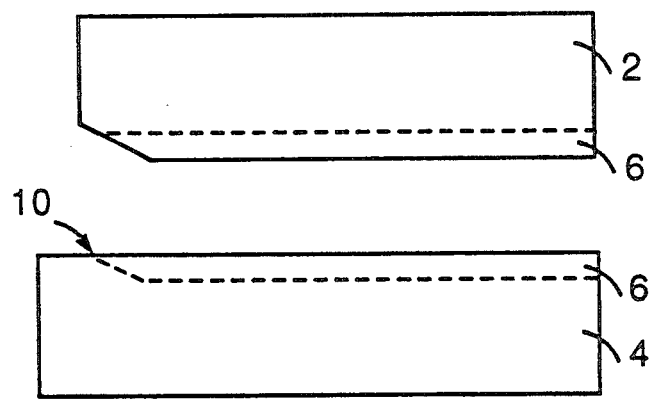
FIG. 2 illustrates the effect of the present process in eliminating the sharp corner between lapped and unlapped material in a bevel gear tooth and mating pinion gear tooth.

The solution to this problem is to eliminate the sharp corner 8 that exists between the lapped and unlapped regions. FIG. 2 shows the effect of the present invention in that the area between the lapped and unlapped regions 10 now has a smooth tapering contour thereby eliminating the sharp corner 8 associated with lapping interference.

Figure 3:
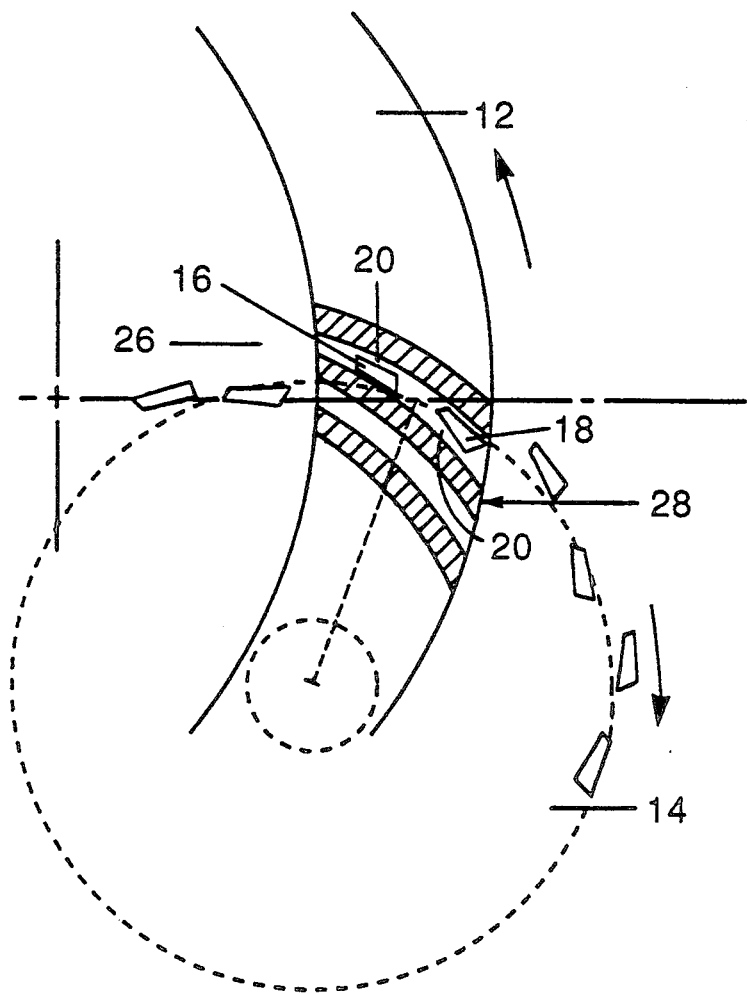
FIG. 3 illustrates the arrangement of the workpiece and cutter in a conventional face hobbing process.

FIG. 3 shows the conventional process for forming face hobbed bevel gears. The work gear 12 and the cutter 14 rotate in a timed relationship. The cutter 14 has inside blades 16 which form the convex profiles 24 (See FIG. 4) of the tooth flanks and outside blades 18 which form the concave profiles 22 of the tooth flanks.

The cutting blades contact the work gear at the toe end 26 and exit at the heel end 28. In the prior art, the width of the cutting blades was selected so that they could pass through the tooth width at the toe end 26 without cutting on the side opposite the cutting side. This opposite side is known as the clearance side. As the blades passed through the tooth slot a clearance area 20 of increasing width was gradually formed due to the tapering tooth profile produced by the rotating motions of the work gear 12 and cutter 14.

The present process performs the cutting operation with the use of a blade having a point width of a dimension greater than the width of the tooth slot at the toe end thereof. The blades having this increased point width may be either the outside or the inside blades. When the blades contact the toe end of the slot the increased width causes additional stock to be removed from the side opposite the normal cutting side of the blade, i.e. stock is removed by the "clearance side" of the blades.

Figure 4:
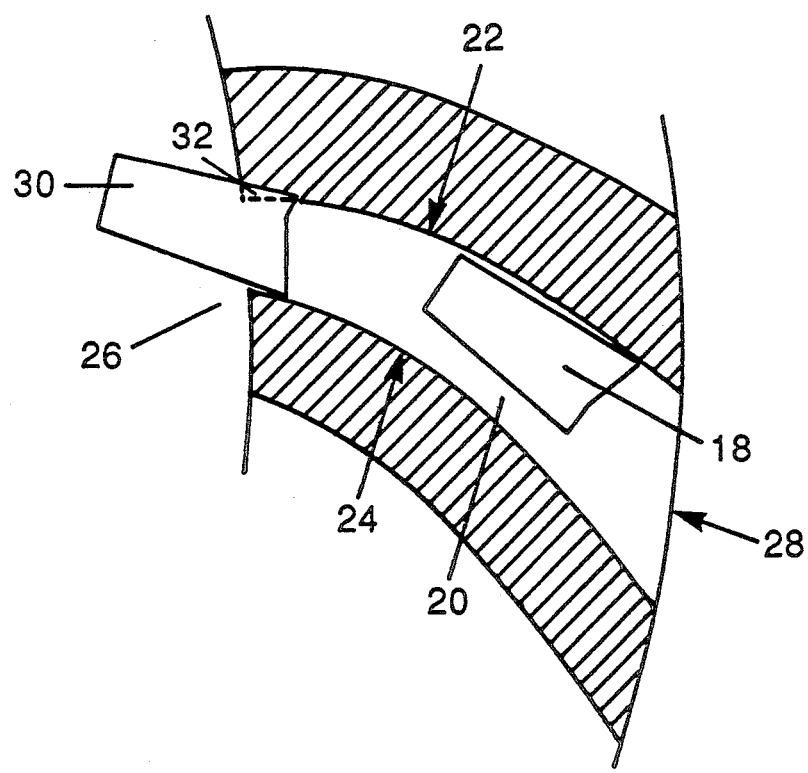
FIG. 4 illustrates outside and inside cutting blades passing through a tooth slot according to the present invention.

FIG. 4 illustrates an inside blade 30 passing through the toe region 26 of a bevel gear tooth slot. It can be seen that in addition to the function of forming the convex profile 24 of the tooth flank the inside blade 30 also contacts additional stock on the concave profile 22 of the adjacent tooth flank. Reference number 32 shows by dashed line the additional stock removed due to the increased point width of the blade 30. As the cutting blade 30 passes further into the tooth slot contact with the side opposite its normal cutting side gradually diminishes due to the taper of the tooth (See FIG. 5). A toe relief surface 34 is formed by the removal of the additional stock. Generally, the length of this surface is about 150-200 thousandths of an inch. The cutting blade pressure angle of the side opposite the normal cutting side is selected so that the toe relief surface 34 is substantially a right angle (normal) to the root 36 of the tooth.

Figure 5:
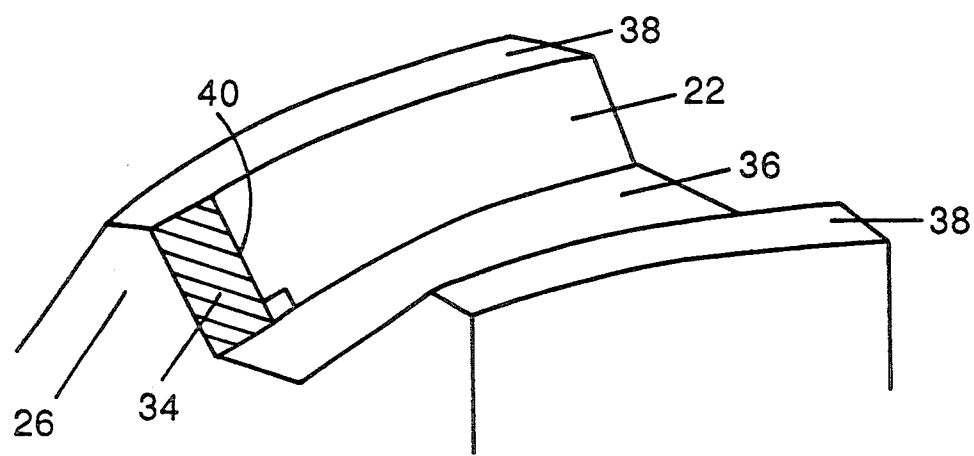
FIG. 5 illustrates the effect of the present process by showing the relief surface formed in the slot of a bevel gear tooth.

FIG. 5 shows a portion of a gear produced by the present process having a topland 38, concave flank 22 and root portion 36. It can be seen that a relief surface 34 has been formed in the concave flank 22 by the cutting due to an inside blade. The relief surface 34 extends from the toe end 26 to a cutting edge 40 which is the point where, due to the taper of the tooth slot, the cutting blade lost contact with the slot. Beyond this point a clearance would gradually form between the blade and the slot. This clearance is formed on the relief side of the blade only.

It can be seen that the opposite effect can be obtained by the outside blades, that is, forming the concave profile of the tooth flank while also forming a toe relief surface on the convex side of the tooth. The relief surface is preferably cut at the toe end of the convex side since this is the drive side of the gear.

It can also be clearly seen that the length of the toe relief surface along the root can be controlled by adjusting the width of the cutting blades. A wider cutting blade will cut a relief surface of greater length since it will be in contact with stock material opposite its normal cutting side through a greater length of the root before contact is lost due to the taper of the slot.

The present invention therefore produces a relief at the toe end of a tooth slot in a bevel gear during the initial cutting thereof thereby eliminating the need for a secondary chamfering operation.

While the process herein described constitutes a preferred embodiment of the invention, it is to be understood that the invention is not limited to the precise steps of the process, and that changes may be made therein without departing from the scope and spirit of the invention as defined by the appended claims.

We claim:

1. A method of continuously forming a bevel gear having toe relief, said method comprising:

forming a plurality of teeth about said bevel gear by continuously cutting a gear blank, wherein each of said teeth extend longitudinally from a toe end to a heel end, each of said teeth having a longitudinally extending convex flank and a longitudinally extending concave flank, said teeth being separated by root portions, and, simultaneously with said cutting, forming a relief surface at each of the toe ends of one of said convex and concave flanks, with the relief surface being formed in flanks of the same curvature for all teeth of said gear.

2. The method of claim 1 comprising forming said relief surface at said toe end of said convex flanks.

3. The method of claim 2 wherein said root portions and said relief surface are at a substantially right angle with respect to one another.

4. The method of claim 1 wherein said root portions and said relief surface are at a substantially right angle with respect to one another.

5. A method of continuously forming tooth formations for a bevel gear having a plurality of teeth arranged about said bevel gear with each of said teeth extending in a longitudinally curved direction from a toe end to a heel end and having a topland and two flank portions, said flank portions extending from said topland downwardly to root portions located between each of said teeth, with one of said flank portions having a longitudinally extending concave profile and the other of said flank portions having a longitudinally extending convex profile, with the flank of a tooth and the root portion and adjacent flank of an immediately adjacent tooth, forming a tooth slot, said slot extending in a longitudinally curved and tapered direction from said toe end to said heel end, said bevel gear further having a plurality of said tooth slots and said teeth arranged alternatively about said bevel gear with said convex profiled flank or said concave profiled flank of each tooth having a relief surface formed thereon at the toe end thereof, said method comprising:

providing a cutter having a plurality of blades thereon, arranging said blades about said cutter in groups comprising inside blades and groups comprising outside blades, providing said inside blades or said outside blades with a cutting width of a dimension greater than the width of said tooth slots at said toe ends thereof, rotating said cutter, rotating a gear blank, engaging said rotating cutter and said rotating gear blank in a timed relationship, cutting said concave profiles with said outside blades and cutting said convex profiles with said inside blades, simultaneously with said cutting, forming a relief surface at each of the toe ends of one of said convex flanks and said concave flanks with said relief surface being formed in the same flank profile for all teeth of said gear.

6. The method of claim 5 comprising forming said relief surface at said toe end of said convex flanks.

7. The method of claim 6 wherein said root portions and said relief surface are at a substantially right angle with respect to one another.

8. The method of claim 5 wherein said root portions and said relief surface are at a substantially right angle with respect to one another.

9. In a method of continuously forming a bevel gear having toe relief, said bevel gear comprising a plurality of teeth extending from a toe end to a heel end with each tooth comprising a topland, two flank portions extending downwardly from said topland to root portions adjacent thereto, one of said flank portions having a longitudinally extending concave profile and the other of said flank portions having a longitudinally extending convex profile, said method including the steps of:

providing a cutter having a plurality of blades thereon, arranging said blades about said cutter in groups comprising inside blades and groups comprising outside blades, rotating said cutter, rotating a gear blank, engaging said rotating cutter and said rotating gear blank in a timed relationship, and, cutting said concave profiles with said outside blades and cutting said convex profiles with said inside blades, the improvement comprising:

simultaneously with said cutting, forming a relief surface at each of the toe ends of one of said convex flanks and said concave flanks, with the relief surface being formed on the same flank profile for all teeth of said gear.

10. The method of claim 9 comprising forming said relief surface at said toe end of said convex flank.

11. The method of claim 10 wherein said root portions and said relief surface are at a substantially right angle with respect to one another.

12. The method of claim 9 wherein said root portions and said relief surface are at a substantially right angle with respect to one another.

* * * * *